(12) United States Patent
Comeau (10) Patent No.: US 8,818,974 B2
(45) Date of Patent: Aug. 26, 2014

(54) SYSTEM AND METHOD FOR SYNCHRONOUSLY UPDATING A HIERARCHY BRIDGE TABLE

(75) Inventor: Gregory P. Comeau, Longmont, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 12/913,561

(22) Filed: Oct. 27, 2010

(65) Prior Publication Data

US 2012/0109917 A1    May 3, 2012

(51) Int. Cl.
*G06F 7/00* (2006.01)

(52) U.S. Cl.
USPC ......................................................... 707/703

(58) Field of Classification Search
None
See application file for complete search history.

(56) References Cited

U.S. PATENT DOCUMENTS

| | | | |
|---|---|---|---|
| 6,732,122 B2 * | 5/2004 | Zoltan .......................... | 707/610 |
| 2001/0042059 A1 * | 11/2001 | Uehara et al. ..................... | 707/1 |
| 2003/0078916 A1 * | 4/2003 | DeForeest et al. ................ | 707/3 |
| 2007/0027884 A1 * | 2/2007 | Heger et al. .................... | 707/100 |
| 2007/0061287 A1 * | 3/2007 | Le et al. ............................ | 707/2 |

* cited by examiner

*Primary Examiner* — Apu Mofiz
*Assistant Examiner* — Thu Nga Nguyen (57) ABSTRACT

A method for maintaining a hierarchy bridge table consistent with a corresponding hierarchy table includes listening for a transaction, having a start boundary and an end boundary, on the hierarchy table; and upon detecting and identifying the transaction, directing execution of an update method on the bridge table, where the update method is completed within the boundaries of the transaction using the identity of the transaction and a state of the bridge table at the start boundary of the transaction.

16 Claims, 8 Drawing Sheets

| | 110 | 112 | 113 | |
|---|---|---|---|---|
| 111 | PARENT NODE ID | CHILD NODE ID | LEVEL FROM PARENT | |
| | 10 | 10 | 0 | 121 |
| | 10 | 20 | 1 | 122 |
| | 10 | 30 | 1 | 123 |
| | 10 | 40 | 2 | 124 |
| | 10 | 50 | 3 | 125 |
| | 10 | 60 | 4 | 126 |
| | 20 | 20 | 0 | 127 |
| | 20 | 40 | 1 | 128 |
| | 20 | 50 | 2 | 129 |
| | 20 | 60 | 3 | 130 |
| | 30 | 30 | 0 | 131 |
| | 40 | 40 | 0 | 132 |
| | 40 | 50 | 1 | 133 |
| | 40 | 60 | 2 | 134 |
| | 50 | 50 | 0 | 135 |
| | 50 | 60 | 1 | 136 |
| | 60 | 60 | 0 | 137 |

SYSTEM AND METHOD FOR SYNCHRONOUSLY UPDATING A HIERARCHY BRIDGE TABLE

BACKGROUND

Large, complex data systems may be expressed using a variety of data structures. One common data structure is a hierarchy. A hierarchy is based on an asymmetrical relationship such as "is the manager of," "is part of," or "is parent of." The relationship is asymmetrical in that it only works one way. For example, Sally is the manager of Jim, but not vice versa. A hierarchy can be represented as an acyclic graph with a single root node. Such a structure is commonly referred to as a tree because it is often depicted as an upside down tree with the root node at the top and its children, grandchildren, etc., fanning out beneath it. In a tree structure, each node, except the root node, contains one ancestor (parent) node but any number of descendent (child) nodes. A tree must be acyclic, meaning there are no cycles (i.e., closed loops) in the tree. If a node is related to another node it must either be a descendent or an ancestor, but never both. In general, there is no rule that every node must have the same number of children, so a tree does not have to be symmetrical or balanced. Such a tree is referred to as "ragged hierarchy of indeterminate depth." A common use for tree structures is to display an organization's internal structure of departments, groupings, and personnel; i.e., an organization chart. More complex trees may be used for a data center to represent the oftentimes thousands of nodes relating components of the data center. The tree structure is commonly stored in a software system using a hierarchy table. The hierarchy table may be used by an appropriate software program to construct and display all or part of the tree structure to a human user and to allow the user to navigate the tree structure. Construction of such a tree from a hierarchy table, or identification of related nodes, depending on the number of involved nodes, can be a time consuming and processor-intensive problem, because finding all of the ancestors of a given node, or all the descendents of a node requires a recursive operation. For example, to find all of the descendents of a node the system must first find all of the immediate children of the node, then find all of the children of those children (i.e. the grandchildren of the original node), then find the children of the grandchildren, and so on recursively until there are no more descendents. A similar recursive operation is necessary to find all of the ancestors of a given node, i.e., to navigate "up" the tree from a given node through all of its ancestors to the root of the tree. In Oracle™, these recursive operations are done using a hierarchical query clause, i.e., SELECT . . . FROM . . . START WITH . . . CONNECT BY. Recursive operations in general, including the above Oracle operation, present a performance problem.

A solution to the performance issue of hierarchy navigation is to use a hierarchy bridge table. A hierarchy bridge table stores all of the ancestor and descendent relationships for a given node simultaneously, allowing determination of a node's ancestors and descendents with a simple, non-recursive operation. However, the hierarchy bridge table must be kept consistent with the state of the hierarchy being represented. Maintaining consistency is complicated as nodes are inserted, deleted, and moved.

DESCRIPTION OF THE DRAWINGS

The detailed description will refer to the following figures in which like numerals refer to like items, and in which.

DETAILED DESCRIPTION

A ragged hierarchy can be arbitrarily wide and deep. Ragged hierarchies often are modeled in a relational database using a table with a many-to-one relationship. This is referred to as the hierarchy table. A node in the ragged hierarchy has a relationship to zero or one parent node. A node with no parent is called a root node. A node may have any number of immediate child nodes. The parent node itself has its own parent node, and so on. A node's related nodes can be classified as ancestor (parent, grandparent, etc.) nodes and descendent (child, grandchild, etc.) nodes.

Many problem domains can be represented by a ragged hierarchy of indeterminate depth. A common example is a corporate organization chart. Another example is a data center. A typical large data center may include processors and storage devices instantiated on blades that are housed in enclosures or racks, rooms, and buildings, and that receive power for operations, cooling air, network connectivity, and data from sources external to and internal to the data center. The data center may contain many thousands of processors and storage devices. All of the various entities that make up the data center may be organized into multiple hierarchies, for example, "Operating Systems", "Manufacturer", "Business Unit", and "Service Class". In the data center example, computer systems may be organized in a tree by operating system. For example, an operating system tree might have a root node called "Operating Systems." The root node may then be divided into immediate child nodes by the major product type (or family), e.g., Linux®, Windows®, MacOS®, SunOS®, HP-UX®, and AIX®. Each family may then be divided into their respective packaging variants, e.g. Windows® 2000, Windows®NT, Windows® Server 2003, Windows® Server 2008, Windows® XP, and Windows® Vista. Each of those groups may then be divided by the processor architecture, e.g. Windows® Server 2008 32-bit Intel, Windows® Server 2008 64-bit Intel, Windows® Server 2008 64-bit Itanium. Each group may be further divided into finer grained subgroups, perhaps by service pack or patch, until the desired granularity is reached, e.g. "Windows® Server 2008 R2 for Itanium, Service Pack 3." To further complicate the hierarchy, each device in the data center may be assigned to multiple nodes in a hierarchy. The grouping of devices at nodes may be accomplished automatically or by human interaction, or a combination of the two. When a data center includes tens of thousands of devices with many different possible feature groupings, the number of nodes in a hierarchy can be enormous. Navigating the hierarchy is time consuming in terms of processor time due to the requisite recursive operations, which can negatively affect system performance and user response time. This is why many systems incorporate a hierarchy bridge table to efficiently navigate the hierarchy.

The process of changing the hierarchy (deleting, inserting, and moving nodes) can be automated using known discovery tools and hierarchy building programs. Thus, as devices are added to a data center, the relationships among the nodes may change, and automatic tools and programs revise the hierarchy accordingly. If a hierarchy bridge table is used for efficient tree navigation, changes to the hierarchy must be reflected in the corresponding hierarchy bridge table. If the changes are not reflected in the hierarchy bridge table, then certain processing threads will see an inconsistency between the current state of the hierarchy and the hierarchy bridge table, resulting in parts of the system appearing to be defective. In other words, for a hierarchy bridge table to be useful, it must always be correct when compared to the corresponding hierarchy. Thus, maintaining the hierarchy bridge table in a manner consistent with the state of the hierarchy is important.

Figure 1:
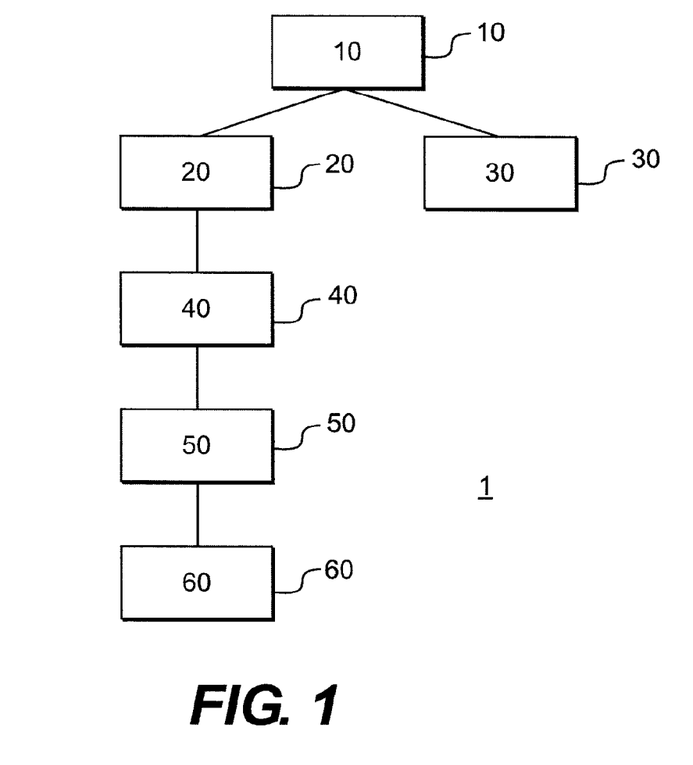
FIG. 1 illustrates an embodiment of a ragged hierarchy of indeterminate depth.
Figure 2:
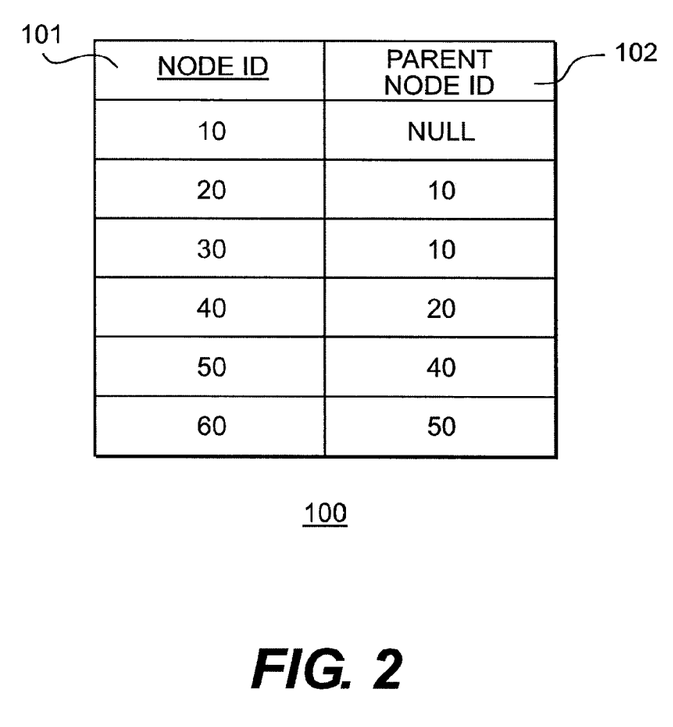
FIG. 2 illustrates a hierarchy table corresponding to the hierarchy of FIG. 1.

FIG. 1 illustrates an embodiment of a ragged hierarchy of indeterminate depth (a greatly simplified hierarchy is shown for ease of illustration), and FIG. 2 illustrates a hierarchy table corresponding to the hierarchy of FIG. 1. In FIG. 1, hierarchy 1 is shown including root node 10, which has as descendents, nodes 20, 30, 40, 50, and 60. Node 20 in turn has as descendents, nodes 40, 50, and 60. Nodes 30 and 60 have no descendent nodes. Node 10, being a root node, has no ancestor nodes.

In FIG. 2, hierarchy table 100 corresponds to the hierarchy 1 of FIG. 1. The hierarchy table 100 includes Node ID column 101 and parent Node ID column 102. The columns 101 and 102 list the relations of the hierarchy 1. Using a recursive algorithm, the data contained in the table 100 can be used to generate, display, and navigate the hierarchy 1. However, because hierarchy navigation is recursive, the time and processor requirements to construct the hierarchy may be undesirable. That is, if it is necessary to find all the descendents of node 20, or all its ancestors, a computationally intensive recursive operation is required. The actual recursive process depends on the program language used. For example, In Oracle™ databases, a hierarchical query clause, i.e., SELECT . . . FROM . . . START WITH . . . CONNECT BY, is used. However, in any programming language, the recursive operation can be very time consuming and can negatively affect the response time of a software system.

Figure 3:
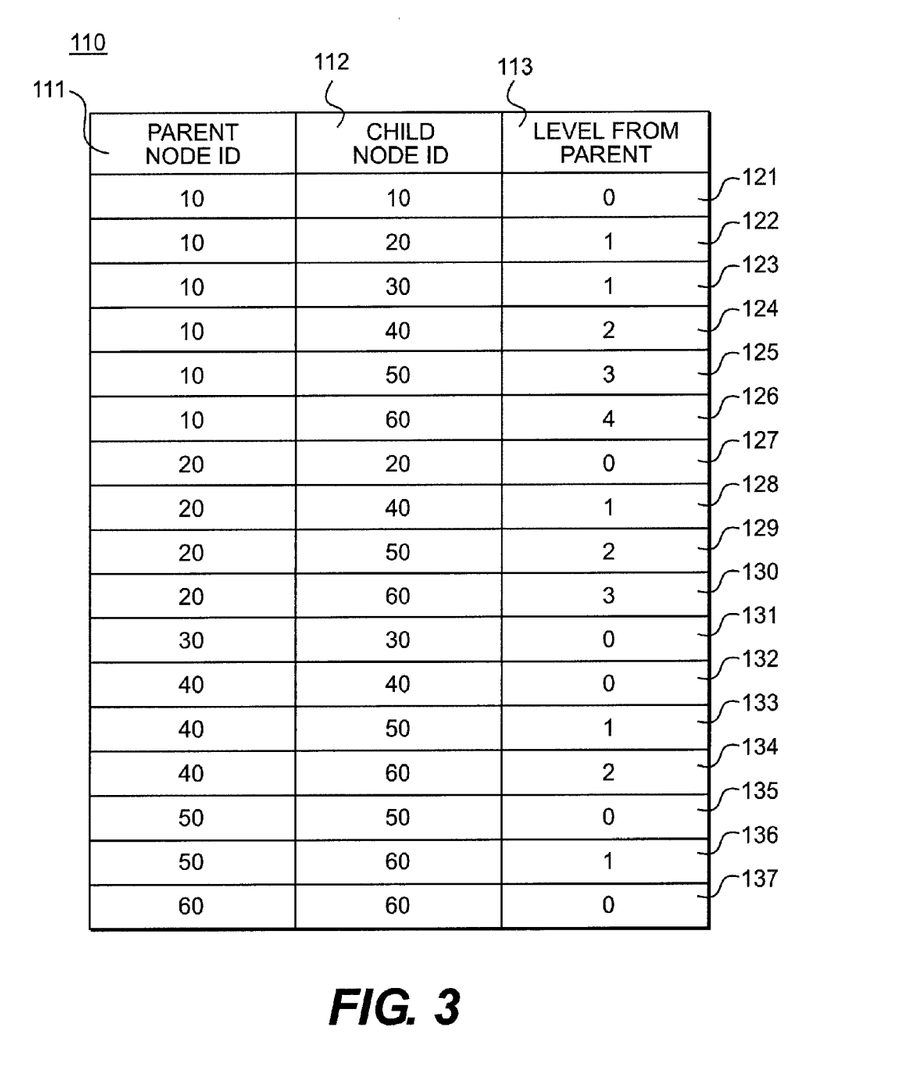
FIG. 3 illustrates a hierarchy bridge table corresponding to the hierarchy table of FIG. 2.

To avoid time consuming recursive operations attendant with the navigation of a hierarchy table, a hierarchy bridge table, an embodiment of which is shown in FIG. 3, may be used. In FIG. 3, hierarchy bridge table 110, which corresponds to hierarchy table 100, is seen to store all ancestor and descendent node relationships simultaneously, arranged in columns 111-113, and rows 121-137. Note that in the table 110, each node is associated with all of its descendents and all of its ancestors. Any given node also is related to itself. Thus, the table 110 allows a program to determine the ancestors and descendents of a given node with a simple, efficient, non-recursive operation. For example, given PARENT_NODE_ID=<node 20>, rows 127-130, representing all of node 20's descendent nodes, will be returned in one simple, non-recursive operation. Conversely, given CHILD_NODE_ID=<node 50>, rows 125, 129, 133, and 135, representing all of node 50's ancestors, will be returned.

However, use of a hierarchy bridge table, such as the table 110, is not without its own set of problems. Most particularly, a hierarchy bridge table can only be used, assuming a desire to correctly identify the desired hierarchical structure, if the bridge table always is consistent with the state of the hierarchy. That is, to maintain consistency as nodes in the hierarchy are moved, inserted, or deleted, the hierarchy bridge table should be updated to reflect the new state of the hierarchy. Furthermore, updating the hierarchy bridge table should be done synchronously (i.e., in the same transaction as the hierarchy update) so that no other processing thread sees an inconsistency between the new hierarchy and the corresponding hierarchy bridge table. The bridge table updating should also be performed quickly to avoid blocking the hierarchy update for an unacceptable amount of time. Moreover, any hierarchy bridge table update mechanism and method should not stop the database system to fully rebuild the hierarchy bridge table. Finally, the update mechanism and method should not need to execute a recursive operation in order to update the hierarchy bridge table. Thus, while using a hierarchy bridge table solves the performance problem attendant with recursively navigating the hierarchy, maintaining the hierarchy bridge table consistent with the hierarchy is itself a performance problem.

Disclosed herein is a method and system for maintaining a hierarchy bridge table in a state consistent with its related hierarchy. The description will refer to implementation using an Oracle™ database. However, the method and system are applicable to any database system that can represent a ragged hierarchy of indeterminate depth.

The system for maintaining the hierarchy bridge table consistent with its related hierarchy includes the hierarchy bridge table 110 of FIG. 3, and the hierarchy table 100 of FIG. 2. Associated with the hierarchy table 100 are listeners (not shown), that determine when a hierarchy change (insert, delete, move) occurs. In some database systems (e.g., Oracle™), such listeners are referred to as row-level triggers. The row-level trigger includes a transaction identification module that detects and identifies a transaction on the hierarchy table to which the device is attached and directs an update module to execute; the identification module also provides a mechanism to identify the hierarchy table to which the row-level trigger is to be attached; the update module provides a method for updating the corresponding bridge table based on the type of transaction (delete, insert, move) and a current state of the bridge table. In effect, the row-level trigger comprises three triggers: a DELETE row-level trigger, an INSERT row-level trigger, and a MOVE row-level trigger. As will be described in detail later, the row-level triggers allow for synchronously updating the bridge table 110 to maintain the bridge table 110 consistent with its associated hierarchy and hierarchy table by reading, detecting, or determining a transaction (delete, insert, move) on the hierarchy table. Reading the transaction causes the row-level trigger to initiate and execute a method to update the bridge table 110 within the same transaction as the hierarchy change.

The tables 100 and 110, along with the associated row-level triggers, are, in an embodiment, part of a larger database system (not shown). The database system may be based on an Oracle™ system, as described above. The system, and associated method, support three primitive operations or transactions on the hierarchy, namely delete a leaf node, insert a leaf node, and move a node (i.e., change a node's parent node). Any other operation can be expressed as a combination of these three primitive operations. For example, deleting a non-leaf node can be decomposed into 1) moving all child nodes of the non-leaf node, making the non-leaf node into a leaf node; and 2) deleting the resulting leaf node. For any given primitive operation on the hierarchy, the necessary updates to the hierarchy bridge table 110 can be derived from a current state of the bridge table 110 itself. That is, the bridge table 110 can be updated by considering only the current contents of the bridge table, making reference to the hierarchy unnecessary.

In an embodiment, a delete leaf node transaction involves a simple algorithm and corresponding method: DELETE all rows in the bridge table where CHILD_NODE_ID=<ID of node being deleted>. This delete node algorithm is initiated by the DELETE row-level trigger, and executed by a processor, each time a node is deleted from the hierarchy table.

An insert leaf node transaction is more complicated. In an embodiment, bridge table rows are created by deriving the new bridge table rows from all current ancestors of the parent of the leaf node being inserted. The insert leaf node transaction results in an insert method that uses a set operation. In this embodiment, the method for executing the insert leaf node transaction is:

Given a node being inserted named X with a parent node Y . . .
  Find the set of rows S1 from the bridge table where CHILD_NODE=Y
  Insert rows in the bridge table where PARENT_NODE=S1.PARENT_NODE, CHILD_NODE=X, CHILD_LEVEL=S1.CHILD_LEVEL+1
  Insert one row where PARENT_NODE=X, CHILD_NODE=X, CHILD_LEVEL=0.

The above insert algorithm, in appropriate coding, is provided in an INSERT row-level trigger attached to the hierarchy table. Whenever a node is inserted into the associated hierarchy, the INSERT row-level trigger initiates and a processor executes the insert algorithm every time a row is inserted into the hierarchy table.

An embodiment of a method for moving a node (i.e., changing a node's parent) requires that certain rows be deleted from the hierarchy bridge table and that other rows be inserted. The method uses set operations, specifically Cartesian product functions, and method steps of the move node transaction may be accomplished using the following algorithm:

Given a node X being updated with a new parent Y
  Find the set of rows S1 from the bridge table where CHILD_NODE=X and PARENT_NODE< >CHILD_NODE, where the operator< > means "is not equal to"
  Find the set of rows S2 from the bridge table where PARENT_NODE=X
  Derive the Cartesian product S3=S1×S2
  Delete rows from the bridge table where PARENT_NODE=S3.S1.PARENT_NODE and CHILD_NODE=S3.S2.CHILD_NODE
  Find the set of rows S4 from the bridge table where CHILD_NODE=Y
  Derive the Cartesian product S5=S4×S2
  Insert new rows in the bridge table where PARENT_NODE=S5.S4.PARENT_NODE, CHILD_NODE=S5.S2.CHILD_NODE, CHILD_LEVEL=S5.S4.CHILD_LEVEL+S5.S2.CHILD_LEVEL+1

As with the other transactions, the coding to execute the above move algorithm is included with the MOVE row-level trigger attached to and referencing the hierarchy table. The MOVE row-level trigger initiates and a processor executes the above move node algorithm for every update that changes the parent of any node.

Figure 4:
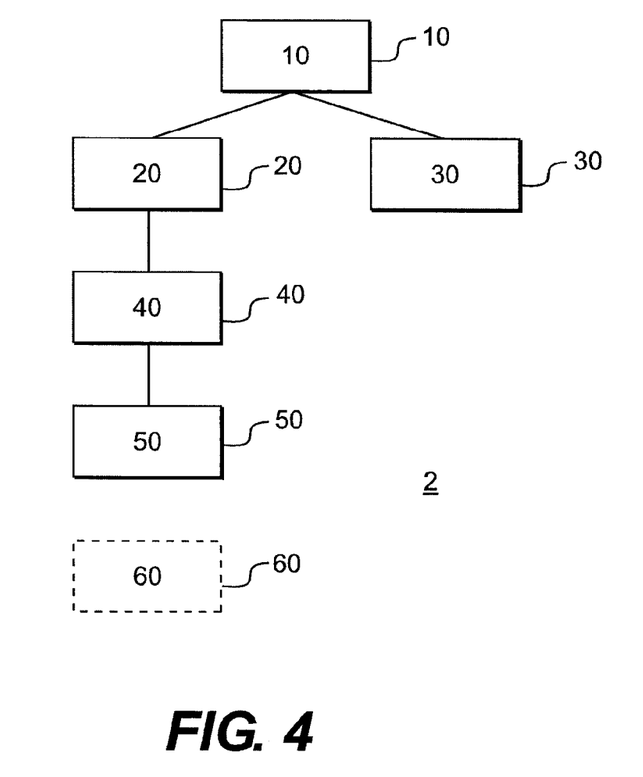
FIG. 4 illustrates the hierarchy of FIG. 1 with a leaf node deleted.

FIG. 4 illustrates an existing hierarchy with a leaf node deleted. As can be seen in FIG. 4, node 60 is being deleted from hierarchy 1. This delete transaction is noted by the DELETE row-level trigger, which then causes a processor to execute a delete node method according to a delete node algorithm embedded in the DELETE row-level trigger. In terms of the bridge table 110, the delete row method will cause rows 126, 130, 134, 136, and 137 (see FIG. 3) to be deleted from the bridge table 110, with the deletion of these rows completed within the boundaries of the delete transaction. That is, when the transaction in which node 60 is deleted from the hierarchy 1 is completed, the corresponding rows have been deleted from the bridge table 110, thereby maintaining the bridge table 110 consistent with the hierarchy table 100 and the hierarchy 1. In other words, the deletion of a node in hierarchy 1 and the corresponding deletion of rows in the hierarchy bridge table 110 are atomic, and a reader of either table will never see a state where the bridge table 110 is inconsistent with the state of the hierarchy 1 and the hierarchy table 100.

Figure 5:
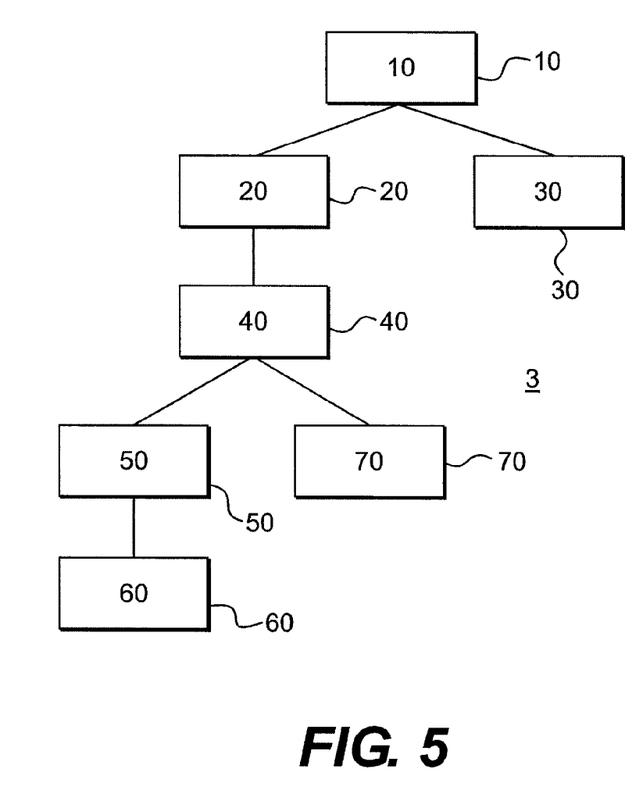
FIG. 5 illustrates the hierarchy of FIG. 1 with a leaf node inserted.

FIG. 5 illustrates an existing hierarchy with a leaf node inserted. As can be seen in FIG. 5, node 70 is inserted into original hierarchy 1, creating hierarchy 3, with node 70 having parent node 40 and no child nodes. This insert transaction is noted by the INSERT row-level trigger, which causes an insert node method to execute according to an insert node algorithm contained in the INSERT row-level trigger. In terms of the bridge table 110 (see FIG. 3), the insert row method derives new rows to insert into the bridge table based on the ancestor(s) of node 70's parent; i.e., node 40. Thus, by considering rows 124, 128, and 132, the insert node method will insert new rows for node 70 as follows: (10/70/3); (20/70/2); (40/70/1); and finally, (70/70/0).

Figure 6:
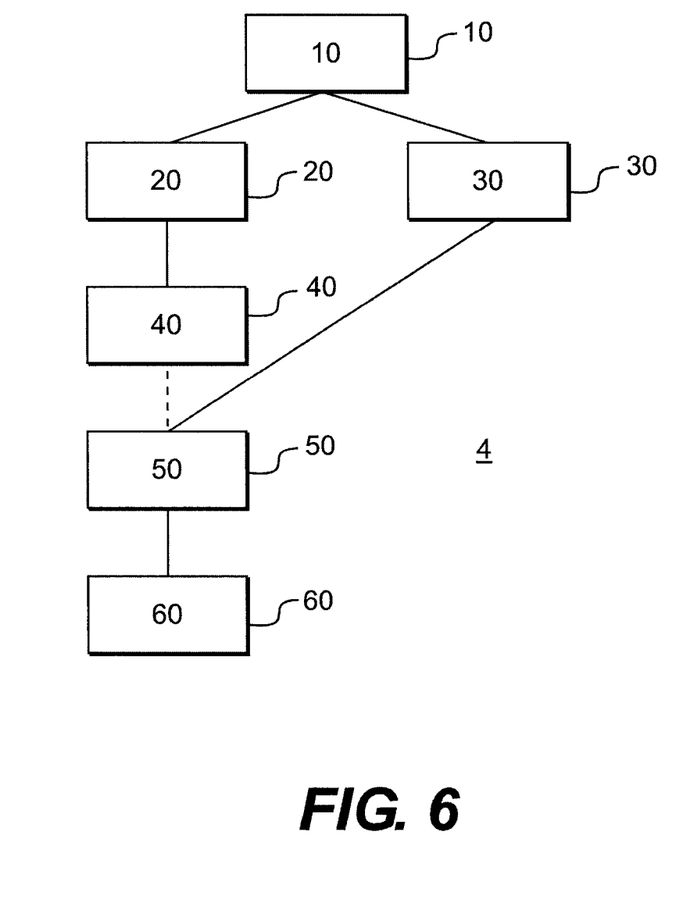
FIG. 6 illustrates the hierarchy of FIG. 1 with a node being moved.

FIG. 6 illustrates an existing hierarchy with a node being moved. As can be seen in FIG. 6, a move node transaction is taking place with the result that the parent of node 50 is changed from node 40 to node 30, resulting in hierarchy 4. To update the bridge table 110 (within the update node transaction boundaries), the MOVE row-level trigger notes the change of parent and causes code within the trigger to execute such that the move node transaction, in conjunction with a current state of the bridge table 110 is sufficient to update the bridge table 110. Specifically, rows 129, 130, 133, and 134 are deleted and two new rows are inserted to indicate the ancestor-descendent relationships among nodes 30, 50, and 60.

Figure 7:
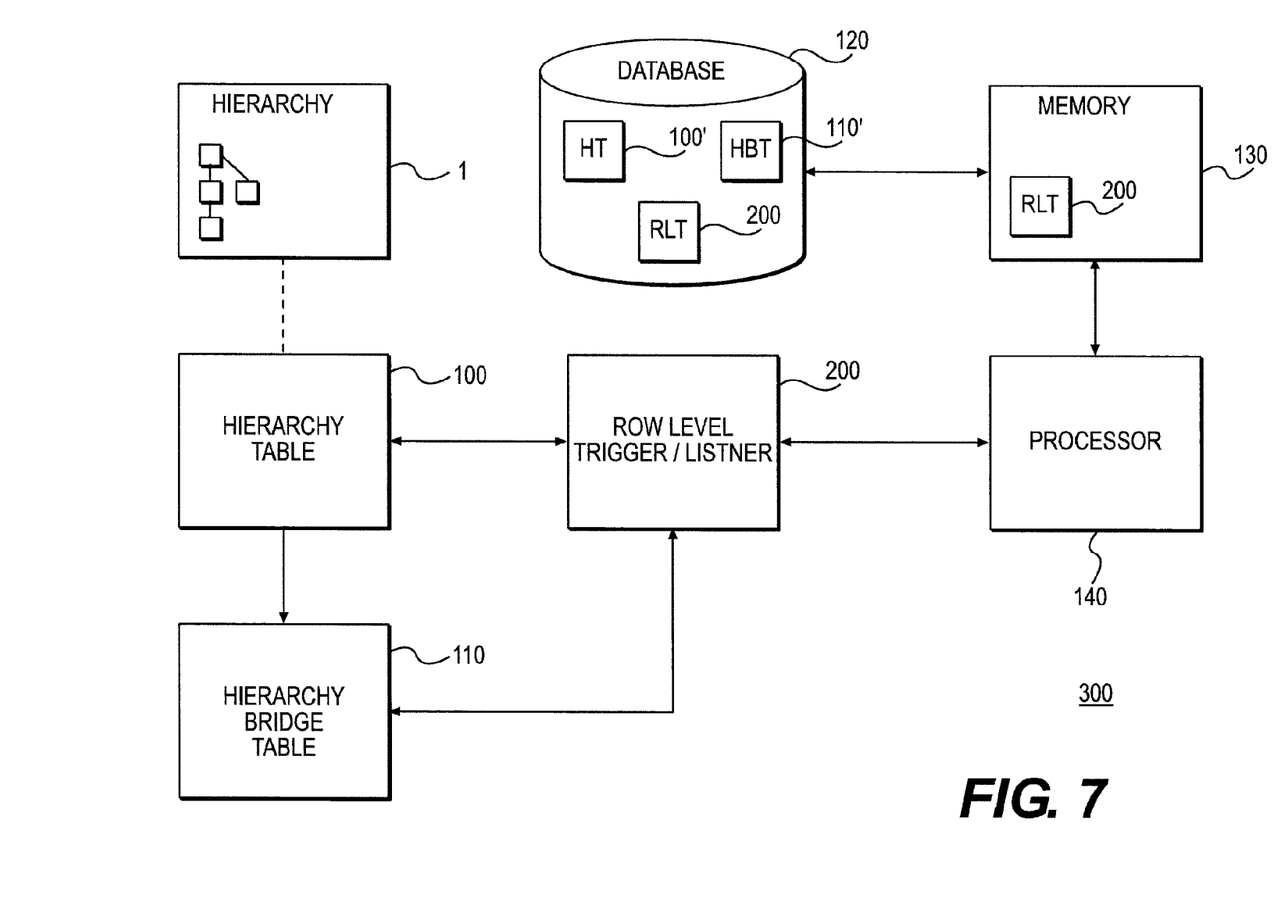
FIG. 7 illustrates an example of a system for synchronously updating a hierarchy bridge table.

FIG. 7 illustrates an embodiment of a system for synchronously updating a hierarchy bridge table. As shown in FIG. 7, system 300 includes hierarchy 1, associated hierarchy table 100, and bridge table 110. Row-level trigger 200 references the hierarchy table 100, as opposed to data within the hierarchy table 100. The data and code for the hierarchy table 100 and the corresponding hierarchy bridge table 110 may be stored as files 100' and 110', respectively, in computer-readable, persistent memory, namely database 120. Also stored in the database 120 are the installation and execution files, and associated data, for the row level trigger 200. Processor 140 functions to execute the executable code of the row-level trigger 200. Memory 130 stores the executable code of the row-level trigger 200 for access by the processor 140.

Figure 8:
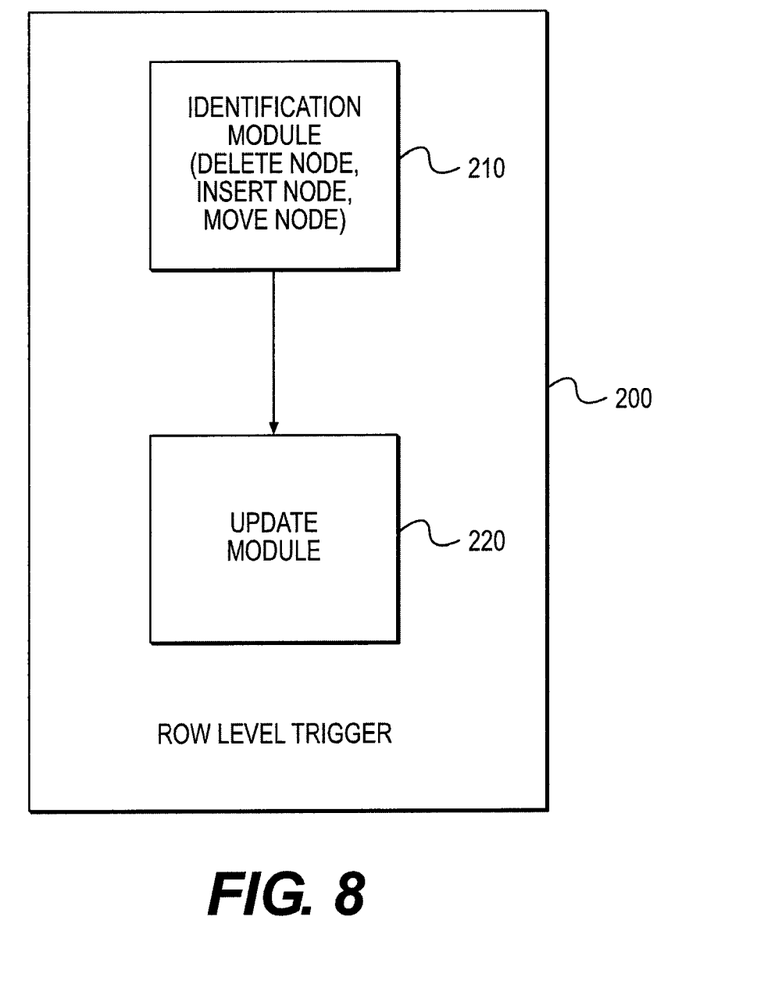
FIG. 8 illustrates an example of a row level trigger used in the system of FIG. 7.

FIG. 8 illustrates an example of the row level trigger 200. The row level trigger 200 includes identification module 210, which serves to designate the hierarchy table to which the row-level trigger is to be attached, and to detect the three primitive transactions on the hierarchy: delete, insert, and move a node. The trigger 200 also includes update module 220. Update module 220 includes the executable code to maintain the hierarchy bridge table consistent with the hierarchy. In an embodiment, the row-level trigger 200 includes a separate row-level trigger (not shown) for each of the three primitive transactions: delete a leaf node, insert a leaf node, and move a node (i.e. update a node to change its parent).

The row-level triggers are used to instruct the processor 140 (see FIG. 7) to run a block of PL/SQL code (i.e., the delete, insert, or move algorithms in the update module 220) when a certain transaction occurs on a given hierarchy table (e.g., the hierarchy table 100). For example, when a row is inserted in the hierarchy table 100, the INSERT row-level trigger instructs the processor 140 to execute code that will update the bridge table 110 to reflect the insertion of the new row or rows.

A mechanism for attaching the row-level trigger to a hierarchy table is contained in definition of the row-level trigger 200; i.e., in the identification module 210. That is, the definition of the row-level trigger 200 names a specific hierarchy table. However, the executable code within the row-level trigger (e.g., the update module logic that is executed by a processor whenever a row is inserted) does not refer to the data in the named hierarchy table.

The distinction between referencing a hierarchy table and referencing the data in the hierarchy table can be illustrated with the following embodiment of an INSERT row-level trigger for an insert node transaction:

```
"create or replace trigger ROLE_CLASSES_AINS
    AFTER INSERT
    on ROLE_CLASSES
    for each row
begin
    -- a new leaf node has been inserted.
    -- insert rows into role_class_bridge to associate
    -- Tancestors of the new node's parent to the new node,
    -- setting child_level to 1+ the level of the relationship
    -- between the ancestor and the new parent.
    insert into ROLE_CLASS_BRIDGE
        (PARENT_ROLE_CLASS_ID,
        CHILD_ROLE_CLASS_ID, CHILD_LEVEL)
    select
        b.parent_role_class_id, :new.role_class_id
        child_role_class_id, child_level
+ 1 child_level
    from
        role_class_bridge b
    where
        b.child_role_class_id = :new.parent_role_class_id;
    -- insert the row to associate the node to itself.
    insert into ROLE_CLASS_BRIDGE
        (PARENT_ROLE_CLASS_ID,
        CHILD_ROLE_CLASS_ID, CHILD_LEVEL)
    values
        (:new.role_class_id, :new.role_class_id, 0);
end;"
```

As noted above, the row-level trigger includes a first, or identification module 210, and a second or update module 220. The identification module 210, "AFTER INSERT on ROLE_CLASSES for each row" tells the processor 140 (see FIG. 7) to execute the INSERT row-level trigger after a row is inserted into a hierarchy table named ROLE_CLASSES. Thus, ROLE_CLASSES is the hierarchy table to which the INSERT row-level trigger is attached. The definition of the row-level trigger refers to a specific hierarchy table for the purpose of attaching the trigger to the table. Without this "naming" in the trigger definition, the processor 140 would not "know" when to execute the trigger.

The actual logic inside the INSERT row-level trigger embodiment is contained in the update module 220; i.e., between the "begin" and "end" keywords. Note that there is nothing in this block of code that refers to the hierarchy table ROLE_CLASSES. Thus, the INSERT row-level trigger does not have to refer back to a hierarchy table in order to make the appropriate updates to the corresponding bridge table.

Considering an INSERT node transaction, when a row is inserted into hierarchy table ROLE_CLASSES, the row that was just inserted is passed to the INSERT row-level trigger. The row values referenced in the trigger are ":new.role_class_id" and ":new.parent_role_class_id". These are the column values of the row that was just inserted. The trigger does not need to refer back to hierarchy table ROLE_CLASSES to look at any other rows. Instead, the row-level trigger only needs to know what row was just inserted, and the row-level trigger then can derive the necessary changes to the bridge table by referring only to the bridge table itself, as was described with respect to FIG. 5.

As noted previously, there is an INSERT row-level trigger for each hierarchy table. The INSERT row-level trigger executes when any row is inserted into the hierarchy table. The same is true for the MOVE and DELETE triggers, with one DELETE trigger and one MOVE trigger attached to the hierarchy table ROLE_CLASSES.

Figure 9A:
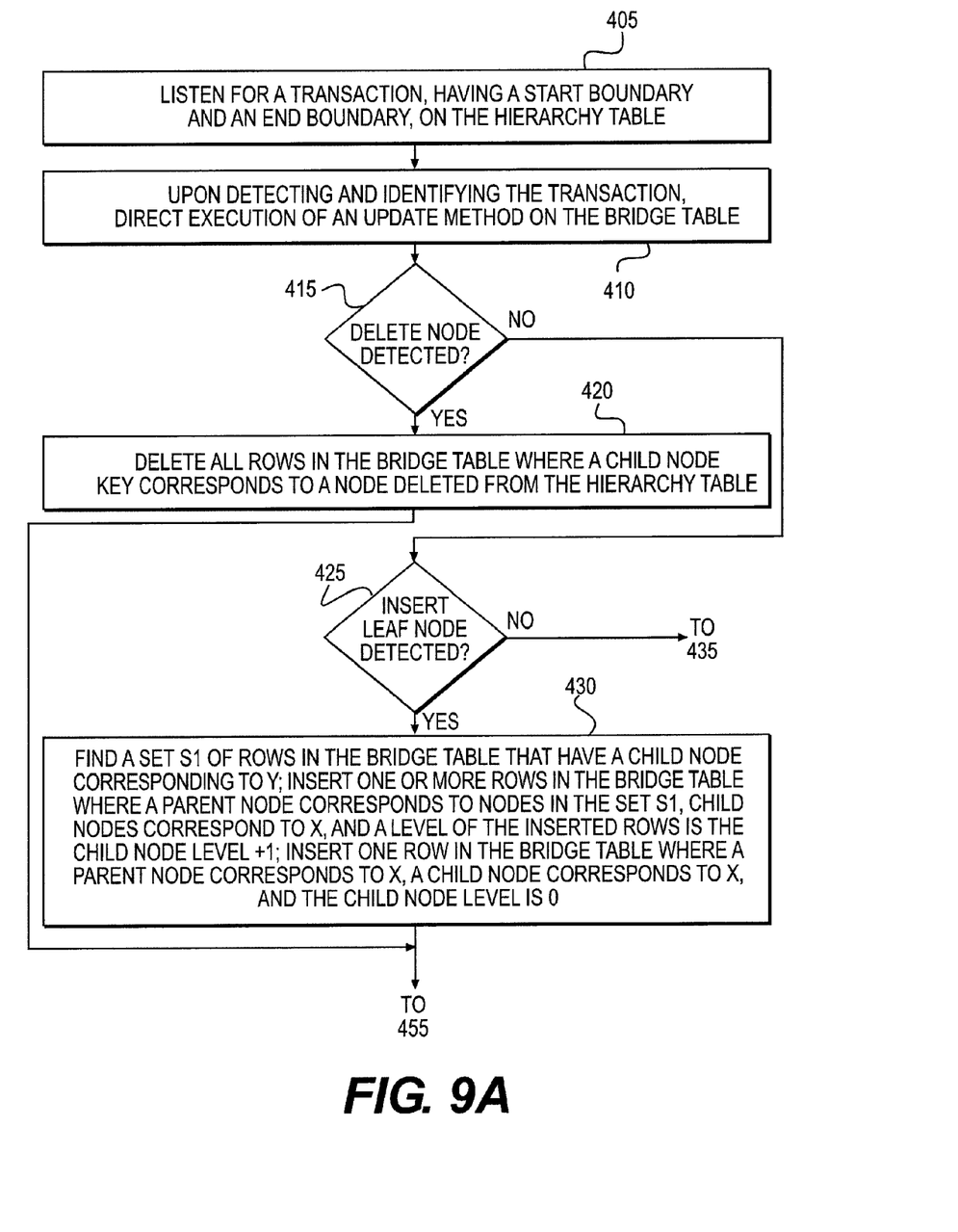
FIGS. 9A and 9B are flowcharts illustrating an example operation of the system of FIG. 7.
Figure 9B:
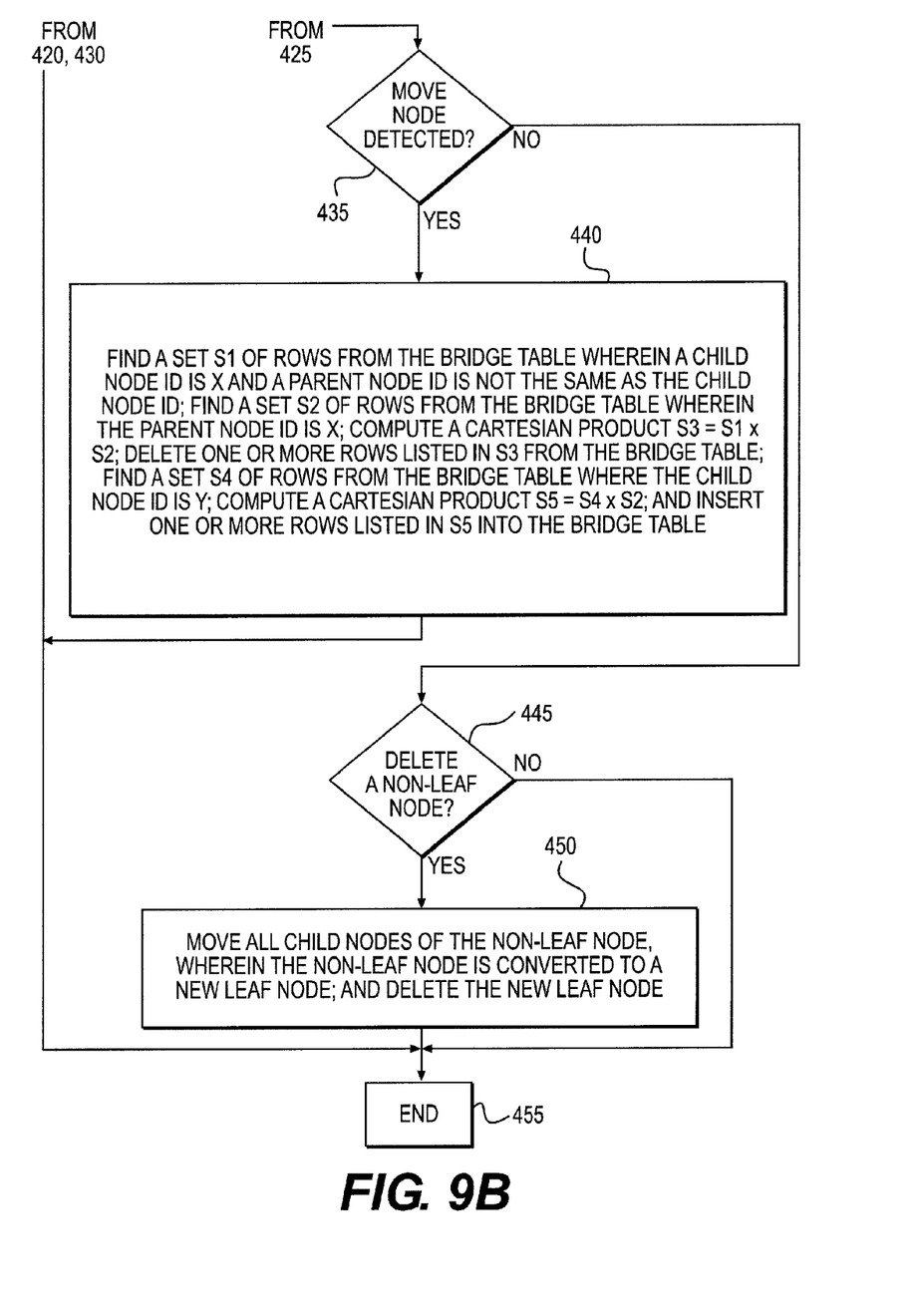

FIGS. 9A and 9B are flowcharts illustrating an example update operation 400 on the hierarchy bridge table 110 using the system 300 of FIG. 7. The operation 400 begins in block 405. In block 405, the trigger 200 listens for a transaction on the hierarchy table. The transaction has a start boundary and an end boundary. In block 410, the trigger 200 detects a transaction; the trigger 200 then identifies the transaction and directs processor 140 to execute of an update method on the bridge table 110. In block 415, the trigger 200 determines if a delete node transaction was detected. If yes (Y), the operation moves to block 420. If no (N), the operation 400 moves to block 425.

In block 420, the processor 140 executes the trigger's delete node executable to delete all rows in the bridge table 110 where a child node key corresponds to a node deleted from the hierarchy table 100. Following block 420, the operation 400 moves to block 455.

In block 425, the trigger 200 determines if an insert leaf node transaction was detected. If yes (Y), the operation 400 moves to block 430. If no, the operation 400 moves to block 435.

In block 430, the processor 140 executes the trigger's insert node executable to insert rows into the hierarchy bridge table 110 by: finding a set S1 of rows in the bridge table that have a child node corresponding to Y; inserting one or more rows in the bridge table where a parent node corresponds to nodes in the set S1, child nodes correspond to X, and a level of the inserted rows is the child node level+1; and inserting one row in the bridge table where a parent node corresponds to X, a child node corresponds to X, and the child node level is 0. Following block 430, the operation 400 moves to block 455.

In block 435 (see FIG. 9B), the trigger 200 determines if a move node transaction was detected. If yes (Y), the operation 400 moves to block 440. If no (N), the operation 400 moves to block 445.

In block 440, the processor 140 executes the trigger's move node executable to change a parent node by: finding a set S1 of rows from the bridge table where a child node ID is X and a parent node ID is not the same as the child node ID; finding a set S2 of rows from the bridge table where the parent node ID is X; computing a Cartesian product S3=S1×S2; deleting one or more rows listed in S3 from the bridge table; finding a set S4 of rows from the bridge table where the child node ID is Y; computing a Cartesian product S5=S4×S2; and inserting one or more rows listed in S5 into the bridge table. Following block 440, the operation 400 moves to block 455.

In block 445, the trigger 200 determines if a delete a non-leaf node transaction was detected. If yes (Y), the operation 400 moves to block 450. If no (N), the operation 400 moves to block 455.

In block 450, the processor 140 executes two of the trigger's executable, namely moving all child nodes of the non-leaf node as per block 440 above, which converts the non-leaf node to a new leaf node; and deleting the new leaf node per block 420 above. The operation 400 then moves to block 455. In block 455, the operation 400 ends, and the hierarchy bridge table 110 is consistent with the changed hierarchy table 100. Moreover, the update to the hierarchy bridge table 110 was completed within the hierarchy table transaction start and stop boundaries.

What is claimed is:

1. A non-transitory computer-readable medium including programming for execution by a processor, the programming, when executed by the processor, implementing a method, comprising:

listening for a transaction, having a start boundary and an end boundary, on a hierarchy table; and upon detecting and identifying the transaction, directing execution of an update method on a bridge table, wherein the update method is completed within the boundaries of the transaction using the identity of the transaction and a state of the bridge table at the start boundary of the transaction, wherein the transaction is a move node transaction in which a node X is updated with a new parent node Y, and wherein the update method comprises:

finding a set S1 of rows from the bridge table wherein a child node ID is X and a parent node ID is not the same as the child node ID;

finding a set S2 of rows from the bridge table wherein the parent node ID is X;

computing a Cartesian product S3=S1×S2;

deleting one or more rows listed in S3 from the bridge table;

finding a set S4 of rows from the bridge table wherein the child node ID is Y;

computing a Cartesian product S5=S4×S2; and inserting one or more rows listed in S5 into the bridge table.

2. The computer-readable medium of claim 1, wherein the transaction is a delete node transaction, and wherein the update method comprises the step of deleting all rows in the bridge table where a child node key corresponds to a node deleted from the hierarchy table.

3. The computer-readable medium of claim 1, wherein the transaction is an insert leaf node transaction in which a node X with parent Y is inserted into the hierarchy table, and wherein the update method comprises the steps of:

finding a set S1 of rows in the bridge table that have a child node corresponding to Y;

inserting one or more rows in the bridge table wherein a parent node corresponds to nodes in the set S1, child nodes correspond to X, and a level of the inserted rows is the child node level+1; and inserting one row in the bridge table where a parent node corresponds to X, a child node corresponds to X, and the child node level is 0.

4. The computer-readable medium of claim 1, wherein the transaction comprises deleting a non-leaf node.

5. The computer-readable medium of claim 4, wherein deleting the non-leaf node comprises:

moving all child nodes of the non-leaf node, wherein the non-leaf node is converted to a new leaf node; and deleting the new leaf node.

6. The computer-readable medium of claim 1, wherein the hierarchy table is identified in a definition of a row-level trigger attached to the hierarchy table.

7. The computer-readable medium of claim 6, wherein the row-level trigger comprises a DELETE row-level trigger, an INSERT row-level trigger, and a MOVE row-level trigger.

8. The computer-readable medium of claim 7, wherein the row-level trigger comprises the programming executed by the processor.

9. A system for synchronously maintaining a hierarchy bridge table consistent with a corresponding hierarchy table, comprising a processor and memory, the processor configured to execute code stored in the memory, the memory storing executable code serving as an identification module and an update module, wherein:

the identification module, when executed by the processor, detects and identifies a transaction on a hierarchy table, and provides an instruction to execute a method to update a bridge table, wherein the transaction include one of a delete leaf node, insert leaf node, and move node transaction, wherein in response to a move node transaction in which a node X is updated with a new parent Y, the update module is executed to complete the steps of:

finding the set of rows S1 from the bridge table where CHILD_NODE=X and PARENT_NODE< >CHILD_NODE, finding a set of rows S2 from the bridge table where PARENT_NODE=X, deriving a Cartesian product S3=S1×S2, deleting rows from the bridge table where PARENT_NODE=S3.S1.PARENT_NODE and CHILD_NODE=S3.S2CHILD_NODE, finding a set of rows S4 from the bridge table where CHILD_NODE=Y deriving a Cartesian product S5=S4×S2, and inserting new rows in the bridge table where PARENT_NODE=S5.S4.PARENT_NODE, CHILD_NODE=S5.S2CHILD_NODE, CHILD_LEVEL=S5.S4.CHILD_LEVEL+ S5.S2.CHILD_LEVEL+1; and the update module, when executed by the processor, in response to the instruction, updates the bridge table to maintain the bridge table consistent with the corresponding hierarchy table, wherein the update to the bridge table is completed within a boundary of the transaction of the hierarchy table.

10. The system of claim 9, wherein, in response to the delete leaf node transaction, the update module is executed to delete all rows in the bridge table where a child node key corresponds to a node deleted from the hierarchy table according to step DELETE all rows in the bridge table where CHILD_NODE_ID=being deleted>.

11. The system of claim 9, wherein, in response to an insert leaf node transaction in which a node X with parent Y is inserted in the hierarchy table, the update module is executed to complete the steps of:

finding a set of rows S 1 from the bridge table having a CHILD_NODE=Y, inserting rows in the bridge table where PARENT_NODE=S 1.PARENT_NODE, CHILD_NODE=X, CHILD_LEVEL=S1.CHILD_LEVEL+1, and inserting one row in the bridge table where PARENT_NODE=X, CHILD_NODE=X, CHILD_LEVEL=0.

12. A method for maintaining a hierarchy bridge table consistent with a corresponding hierarchy table, comprising:

listening for a transaction, having a start boundary and an end boundary, on a hierarchy table wherein the transaction is a move node transaction in which a node X is updated with a new parent node Y, and wherein the update method comprises the steps of:
finding a set S1 of rows from the bridge table wherein a child node ID is X and a parent node ID is not the same as the child node ID;
finding a set S2 of rows from the bridge table wherein the parent node ID is X;
computing a Cartesian product S3=S1×S2;
deleting one or more rows listed in S3 from the bridge table;
finding a set S4 of rows from the bridge table wherein the child node ID is Y;
computing a Cartesian product S5=S4×S2; and
inserting one or more rows listed in S5 into the bridge table; and
upon detecting and identifying the transaction, directing execution of an update method on a bridge table, wherein the update method is completed within the boundaries of the transaction using the identity of the transaction and a state of the bridge table at the start boundary of the transaction.

13. The method of claim 12, wherein the transaction is a delete node transaction, and wherein the update method comprises the step of deleting all rows in the bridge table where a child node key corresponds to a node deleted from the hierarchy table.

14. The method of claim 12, wherein the transaction is an insert leaf node transaction in which a node X with parent Y is inserted into the hierarchy table, and wherein the update method comprises the steps of:
finding a set S1 of rows in the bridge table that have a child node corresponding to Y;
inserting one or more rows in the bridge table wherein a parent node corresponds to nodes in the set S1, child nodes correspond to X, and a level of the inserted rows is the child node level+1; and
inserting one row in the bridge table where a parent node corresponds to X, a child node corresponds to X, and the child node level is 0.

15. The method of claim 12, wherein the transaction comprises deleting a non-leaf node.

16. The method of claim 15, wherein deleting the non-leaf node comprises:
moving all child nodes of the non-leaf node, wherein the non-leaf node is converted to a new leaf node; and
deleting the new leaf node.

* * * * *

UNITED STATES PATENT AND TRADEMARK OFFICE
CERTIFICATE OF CORRECTION

PATENT NO.       : 8,818,974 B2
APPLICATION NO.  : 12/913561
DATED            : August 26, 2014
INVENTOR(S)      : Gregory P. Comeau Page 1 of 1

It is certified that error appears in the above-identified patent and that said Letters Patent is hereby corrected as shown below:

In the Claims,

In column 10, line 33, in Claim 9, delete "S2CHILD" and insert -- S2.CHILD --, therefor.

In column 10, line 38, in Claim 9, delete "S2CHILD" and insert -- S2.CHILD --, therefor.

In column 10, line 52, in Claim 10, delete "being" and insert -- <ID of node being --, therefor.

In column 10, line 57, in Claim 11, delete "S 1" and insert -- S1 --, therefor.

In column 10, line 60, in Claim 11, delete "S 1" and insert -- S1 --, therefor.

Signed and Sealed this
Sixteenth Day of December, 2014

Michelle K. Lee
*Deputy Director of the United States Patent and Trademark Office*